United States Patent Office 2,782,180
Patented Feb. 19, 1957

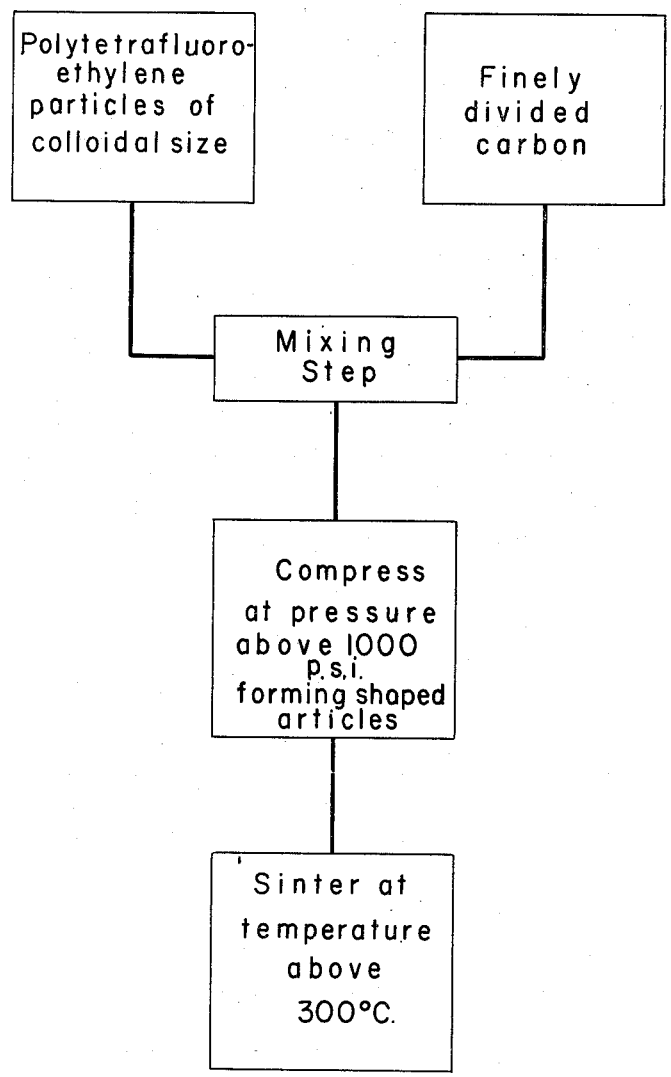

2,782,180
MODIFIED POLYTETRAFLUOROETHYLENE COMPOSITIONS AND PRODUCTS RELATED THERETO

Verne Wesley Weidman, Wilmington, Del., assignor to E. I. du Pont de Nemours and Company, Wilmington, Del., a corporation of Delaware Application August 25, 1952, Serial No. 306,301

8 Claims. (Cl. 260—41)

This invention concerns modified polytetrafluoroethylene compositions and other closely related compositions. More particularly, it relates to novel mixtures comprising polymerized tetrafluoroethylene, polymerized chlorotrifluoroethylene, etc., in the form of colloidal-sized particles, intimately admixed with a solid filler such as finely divided carbon or zircon. This application is a continuation-in-part of my copending application U. S. Serial No. 175,485, filed July 22, 1950, now abandoned.

Mixtures of carbon with polytetrafluoroethylene have been known heretofore. Such mixtures have been molded under pressure to form shaped articles in which modulus of rupture has been relatively low.

An object of this invention is to provide improved compositions based on polytetrafluoroethylene, or closely related polymers, and solid fillers. An additional object is to provide a new and useful polytetrafluoroethylene composition in the form of a dry, molding powder having a high content of solid filler, which composition, nevertheless, yields shaped articles having a relatively high modulus of rupture. Other objects will be apparent from the description of the invention given below.

The present invention provides a pressure-coalescing composition comprising colloidal particles of a polymer of the class consisting of tetrafluoroethylene polymer and chlorotrifluoroethylene polymer, finely divided filler, such as a filler from the group consisting of finely divided carbon (including graphite, etc.), zircon, titania, or the like. The polymeric ingredient may be a mixture of tetrafluoroethylene polymer and chlorotrifluoroethylene polymer. A preferred filler which may be employed in the practice of the invention is coke flour. In general the preferred weight ratio of filler to the said polymer is about 1:1 to 9:1. The invention also comprises certain processes for the preparation of the said compositions, as set forth below.

Whereas the invention will be described chiefly with respect to polytetrafluoroethylene (i. e., tetrafluoroethylene homopolymer), it is to be understood that the invention also applies to other tetrafluoroethylene and chlorotrifluoroethylene polymers. Thus, tetrafluoroethylene copolymers comprising the polymerization product of a mixture of tetrafluoroethylene and another unsaturated organic compound (e. g., ethylene and chlorotrifluoroethylene) containing a terminal ethylenic double bond, said organic compound being copolymerizable with tetrafluoroethylene and being present in said mixture in an amount of up to 15% of the combined weight of tetrafluoroethylene and said organic compound, may be employed in place of polytetrafluoroethylene, provided the presence of the other compounds do not destroy the essential and characteristic qualities of the colloidal particles. Also there may be employed tetrafluoroethylene polymers in which the end groups of the polymer chain are supplied by non-polymerizable compounds (e. g., methanol and ethanol) which are present during the polymerization reaction. These polymers are hereinafter referred to as telomers. The term "tetrafluoroethylene polymer" as used herein covers the above three types of polymers, it being understood that all the tetrafluoroethylene polymers of this invention possess a high degree of polymerization and a sintering temperature of at least 300° C. Above the sintering temperature such polymers form a gel but they do not actually melt to a liquid. This is in contrast to the known relatively low molecular weight polymers derived from tetrafluoroethylene and certain tetrafluoroethylene polymer waxes, both of which have sharp melting points.

Methanol-tetrafluoroethylene telomers are tetrafluoroethylene polymers which are prepared in the presence of methanol and which contain methanol combined chemically with the said tetrafluoroethylene polymer; it is believed that the molecules of methanol-tetrafluoroethylene telomer contains end groups supplied by the methanol, so that the formula may be written

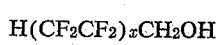

In certain compositions employed in the practice of this invention the number of tetrafluoroethylene units in the telomer is sufficiently high so that the sintering temperature (i. e. the minimum sintering temperature) is about 327° C.; accordingly, in the formula just given, $x$ is quite high, usually in excess of 100.

The methanol-tetrafluoroethylene telomers which are employed in the practice of this invention may be prepared by polymerizing tetrafluoroethylene in the presence of methanol and a free radical producing catalyst such as an organic peroxide. Usually the polymerization is conducted at a temperature within the range of about 0° to 100° C., telomers having relatively lower molecular weights being formed at higher temperatures. In certain embodiments, the polymerization may be conducted under superatmospheric pressure. In order to obtain the methanol-tetrafluoroethylene telomers in colloidal form it is generally desirable to carry out the polymerization in aqueous methanol containing a water-soluble polymerization catalyst and an alkali metal or ammonium salt of an acid of the formula

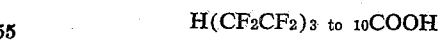

These acids are obtainable by oxidizing, with a permanganate-oxidizing agent, a polyfluoroalkanol of the formula $H(CF_2CF_3)_{3 \text{ to } 10}CH_2OH$. The latter compounds are in turn formed by polymerization of the tetrafluoroethylene in the presence of methanol and an organic peroxide catalyst at a temperature between 75° and 350° C., as disclosed in U. S. patent application S. N. 65,063, filed by R. M. Joyce on December 13, 1948. Such salts of fluoroalkanoic acid serve as dispersing aids. It is to be understood, however, that other dispersing aids may be employed in place of the salt of the above-mentioned fluoroalkanoic acid.

Any suitable method for admixing the colloidal particles of tetrafluoroethylene polymer with the finely divided, solid filler may be employed. For example, the mixture obtained in the polymerization, containing the polymer dispersed in a liquid phase can be admixed with the finely divided filler, and the mixture can thereafter be dried in an oven to remove all of the water. Alternatively, the colloidal particles of the polymer can be suspended in water containing about 0.25 to 10%, preferably 0.25 to 2.5% (based on the weight of polymer), of a dispersing agent such as a sodium alkyl sulfate, in which dispersion the finely divided filler can be dispersed; upon drying the resulting mixture a suitable molding composition can be obtained. In general it is highly important to remove all volatile matter from the molding composition prior to producing shaped articles therefrom. The drying can be accomplished at any temperature up to the sintering temperature; a suitable drying temperature is about 100° to 110° C.

The compositions obtained in the practice of this invention can be molded by compression, preferably through the use of pressures exceeding one thousand pounds per square inch. Relatively lower pressures are sufficient for hot pressing, and relatively high pressures (up to 10,000 pounds per square inch and higher) may be used with advantage for cold pressing.

One of the important aspects of a specific embodiment of the invention resides in providing a composition which undergoes no change in dimensions or virtually none, upon sintering. This is highly significant because, after the herein-disclosed compositions have been molded by compression, it is necessary to heat the shaped articles thus formed to a sintering temperature in order to produce articles having a high modulus of rupture. A sintering temperature above 300° C. (preferably about 327° to 410° C.) is used for this purpose. The minimum sintering temperature is 300° to 327° C. At temperatures in the range of 450° C. to 500° C., and higher, partial degradation of the polymer may occur, as evidenced by the liberation of a substance which etches glass.

Compositions in which the weight ratio of tetrafluoroethylene polymer to coke flour is a critical value within the range of 1:2 to 1:3 undergo no change in dimensions or virtually none, on sintering. The proportion of polymer:filler required to avoid dimensional change differs with the nature of the filler; with graphite as filler the ratio is about 1:1; with zircon it is about 1:4 to 1:6. In other polytetrafluoroethylene molding compositions a dimension change generally does occur on sintering, and this is undesirable from the standpoint of quality and appearance of the product, especially when the production of large pieces is involved.

The time required for heating the molded products at the sintering temperature varies with the size of the shaped article; for ordinary small articles not exceeding a few inches in largest dimension, a sintering time of about 0.5 to 1.0 hour is sufficient, but for relatively large pieces a longer sintering time should be employed.

The invention is illustrated further by means of the accompanying drawing and the following examples.

*Example 1.*—Two parts by weight of coke flour and one part by weight of methanol-tetrafluoroethylene telomer in the form of a stabilized (1% Duponol, sodium alkyl sulfate) aqueous suspension of colloidal particles (37% by weight) were intimately admixed and the resulting suspension was freed directly of water by evaporation at 110° C. The resulting mixture was molded into a plate by compression at a pressure of 10,000 lbs./sq. in. at room temperature. The plate thus obtained was sintered by heating at 400° C. for 0.5 to 1.0 hour. The sintered plate after cooling had a modulus of rupture of 1400 to 1700 lbs./sq. in. as measured by test C67-44, A. S. T. M. Standards 1946, Part II, Nonmetallic Materials (size of test specimen 2 x 0.5 x 0.25 in., with a span between supports of 1.5 in.). The corresponding modulus of rupture for a similarly prepared composition employing colloidal polytetrafluoroethylene particles obtained without using the methanol modifier was 900 to 1000 lbs./sq. in. A similarly prepared plate employing finely divided granular polytetrafluoroethylene of particle size somewhat larger than colloidal had virtually no strength, and could be crumbled readily by hand.

*Example 2.*—Example 1 was repeated using an aqueous slurry of coke flour, blended with an unstabilized suspension of the methanol-tetrafluoroethylene telomer, and coagulated by gentle agitation. The water phase was separated from the solid phase, and the solids were oven-dried as in Example 1. The modulus of rupture of the molded product was 1400 to 1700 lbs./sq. in.

*Example 3.*—Example 2 was repeated, varying, however, the ratio of carbon to methanol-tetrafluoroethylene telomer. The results are set forth in the following table:

| Ratio of C/telomer | Modulus of rupture (lbs./sq. in) |
|---|---|
| 9/1 | 130 to 150 |
| 4/1 | 400 to 500 |
| 2/1 | 1,400 to 1,700 |

*Example 4.*—One part by weight of finely divided graphite in the form of an aqueous slurry and two parts of methanol-tetrafluoroethylene telomer suspension (stabilized by about 1% sodium alkyl sulfate stabilizer as in Example 1) were intimately admixed and moldings were prepared from the resulting blend as in Example 1. The modulus of rupture of the plates thus obtained was 1550 to 1800 lbs./sq. in.

*Example 5.*—Example 4 was repeated using a 1:1 weight ratio of graphite to methanol-tetrafluoroethylene telomer. The modulus of rupture was again 1550 to 1800 lbs./sq. in.

*Example 6.*—Example 4 was repeated using a 2:1 weight ratio of graphite to methanol-tetrafluoroethylene telomer. The modulus of rupture was again 1550 to 1800 lbs./sq. in.

*Example 7.*—One part by weight of methanol-tetrafluoroethylene telomer in water suspension and various parts by weight of finely divided zircon (set forth below) were blended by admixing an aqueous slurry of the zircon with unstabilized methanol-tetrafluoroethylene telomer of colloidal size. The mixtures were coagulated by addition of acetone, filtered and oven-dried at 110° C. The resulting compositions were molded under pressure, and a modulus of rupture was determined, with results as follows:

| Molding Pressure (lbs./sq. in.) | Ratio of Zircon: Telomer | Modulus of rupture (lbs./sq. in.) |
|---|---|---|
| 10,000 | 4/1 | 1,200 to 1,350 |
| 10,000 | 2/1 | 2,000 to 2,150 |

The latter of these two tests was repeated using colloidal polytetrafluoroethylene which was not methanol-modified; the modulus of rupture of the resulting plate was 1000 to 1100 lbs./sq. in.

*Example 8.*—In a series of experiments test plates, dimensions 2 in. x 2 in. x 0.25 in., were molded at room temperature under 10,000 lbs./sq. in. pressure to determine the effect of dispersing agent on the modulus of rupture. The results were as follows:

TABLE I

[Polymer/carbon=1/2.[1]]

| Test No. | Colloidal-sized Polymer | Stabilizer [2] | Remarks | Modulus of Rupture (lbs./sq. in.) |
|---|---|---|---|---|
| 1 | Methanoltetrafluoroethylene telomer. | 1% Duponol | Dry coke flour added to 37% disp. | 1,325 |
| 2 | ___do___ | ___do___ | ___do___ | 1,530 |
| 3 | ___do___ | ___do___ | Dry coke flour added to 37% disp. (big batch). | 1,212 |
| 4 | ___do___ | None | 1 coke flour: 1 water (slurry) added to 37% disp. (stirred with spatula). | 1,412 |
| 5 | ___do___ | ___do___ | 1 coke flour: 2 water (slurry) added to 37% disp. (agitated gently). | 1,537 |
| 6 | ___do___ | ___do___ | 1 coke flour: 9 water (slurry) added to 37% disp. (agitated gently). | 1,313 |
| 7 | ___do___ | ___do___ | 1 coke flour: 1 water (slurry) added to 37% disp. (agitated gently). | 1,698 |
| 8 | ___do___ | ___do___ | 1 coke flour: 2 water (slurry) added to 37% disp. (agitated gently). | 1,438 |
| 9 | Tetrafluoroethylene, not methanol-modified. | 1% Duponol | Dry coke flour added to 37% disp. | 964 |
| 10 | ___do___ | None | ___do___ | 2,260 |
| 11 | Methanoltetrafluoroethylene telomer 1 Telomer: 4 carbon. | ___do___ | Same mixing as 8 | 138 |
| 12 | ___do___ | ___do___ | ___do___ | 461 |

[1] Except for batches 11 and 12.
[2] The stabilizer is added to keep the polymer in dispersion during shipment and storage, and it does not necessarily produce any important effect on the final product.

TABLE II

[Polymer/graphite=1/2.]

| Test No. | Colloidal-sized Polymer | Stabilizer | Remarks | Modulus of Rupture (lbs./sq. in.) |
|---|---|---|---|---|
| 13 | Methanoltetrafluoroethylene telomer. | None | 1 graphite No. 38: 3½ water (slurry) added to 37% disp. | 1,682 |
| 14 | ___do___ | ___do___ | ___do___ | 1,621 |
| 15 | ___do___ | 1% Duponol | 1 graphite No. 38:4 water (slurry) added to 37% disp. (big batch). | 1,588 |

TABLE III

[Polymer/zircon=1/3.33]

| Test No. | Colloidal-sized Polymer | Stabilizer | Remarks | Modulus of Rupture (lbs./sq. in.) |
|---|---|---|---|---|
| 16 | Methanoltetrafluoroethylene telomer. | 1% Duponol | Dry filler added to dispersed polymer | 1,370 |
| 17 | Polytetrafluoroethylene, not methanol modified. | ___do___ | ___do___ | 1,060 |
| 18 | Methanoltetrafluoroethylene telomer. | None | ___do___ | 1,520 |

*Example 9.*—A series of corrosion tests was made using 1-inch squares of filled methanol-tetrafluoroethylene telomer compositions stabilized with 1% Duponol, telomer molded at 10,000 lbs./sq. in. pressure at room temperature, and sintered as hereinabove described. In each instance the squares were immersed in the boiling reagents set forth in the following table, with results given below.

TABLE IV

*Filled telomer compositions corrosion resistance determinations*

| Reagent | Weight Loss, Percent | | | | | | | | |
|---|---|---|---|---|---|---|---|---|---|
| | 1 Telomer: 2 Carbon | | | 1 Telomer: 2 Graphite | | | 1 Telomer: 4 Zircon | | |
| | 120 hr. | 192 hr. | 360 hr. | 120 hr. | 192 hr. | 360 hr. | 120 hr. | 192 hr. | 360 hr. |
| 65% HNO₃ | 14.4 | 24.7 | 41.2 | 0.09 | 2.15 | 4.30 | 0.05 | 0.47 | 0.60 |
| 20% HCl | +0.12 | +0.12 | +0.12 | 0.02 | 0.05 | 0.05 | 0.38 | 0.33 | 0.35 |
| 60% H₂SO₄ | +0.00 | +0.09 | 0.09 | 0.02 | +0.01 | +0.06 | 0.27 | 0.53 | 0.73 |
| 78% H₂SO₄ | +0.33 | +0.35 | +0.32 | +0.26 | +0.52 | +0.53 | 0.77 | 0.90 | 1.81 |
| 95% H₂SO₄ | 0.74 | 4.96 | 13.2 | 3.79 | 13.3 | ([1]) | 13.0 | 30.3 | ([1]) |
| Tap H₂O | +0.18 | +0.13 | +0.11 | +0.02 | +0.02 | +0.02 | +0.15 | +0.13 | +0.16 |
| 10% NaOH | +0.09 | +0.19 | +0.06 | +0.07 | +0.05 | 0.05 | 0.66 | 0.02 | 2.98 |

[1] Discontinued—swollen and cracked.

*Example 10.*—A series of tests was made wherein tetrafluoroethylene polymer particles of colloidal size were admixed with filler. The dry mixture was shaped in a mold by compression under 10,000 pounds per square inch pressure at room temperature to form specimens which were 2-inch square blocks, ¼ inch thick, approximately. The specimens were measured carefully at room temperature after pressing; they were then sintered in an oven at 395° C. for 40 minutes, after which they were cooled to room temperature (25° C.) and measured again. The following table shows the dimensional stability (i. e. the constancy of the size of the block, as measured at room temperature), of several specimens, as compared with the dimensional instability of others. The factors affecting dimensional stability are also set forth in the table.

*Properties of chlorotrifluoroethylene polymer molded from colloidal sized particles, filled with carbon (weight ratio, 1:2)*

Compressive Strength, p. s. i. ............................................. 7,300
Modulus of Rupture ......................................................... 2,900
After 2 wks. in—
  20% HCl .................................................................. 2,800
  10% NaOH ................................................................. 2,300
  60% H$_2$SO$_4$ ......................................................... 1,500

| Reagent in Which Specimen Was Immersed | Percent Wt. Loss After Immersion at Reflux Temperature for— | | | |
|---|---|---|---|---|
| | 48 hrs. | 120 hrs. | 192 hrs. | 330 hrs. |
| 20% HCl | +0.03 | 0.0 | 0.0 | +0.05 |
| 60% H$_2$SO$_4$ | 0.0 | 1.33 | 1.45 | 1.18 |
| 10% NaOH | +0.67 | 0.35 | 0.89 | 0.58 |

TABLE V

*Effect of weight ratio of filler:Polymer, and other factors, on dimensional stability of sintered filler-polymer compositions*

| Nature of Polymer | Nature of Filler | Method of Mixing | Weight Ratio of Polymer: Filler | Length of Molded Block Prior to Sintering (in.) | Length of Molded Block After Sintering (in.) | Dimension Change (in.) |
|---|---|---|---|---|---|---|
| A | Coke flour | M | 1:1 | 2.014 | 1.984 | −.020 |
| A | do | M | 1:2 | 2.024 | 2.010 | −.014 |
| A | do | M | 1:3 | 2.036 | 2.040 | +.004 |
| B | do | N | 1:1 | 2.020 | 1.995 | −.025 |
| B | do | N | 1:2 | 2.036 | 2.016 | −.020 |
| B | do | N | 1:3 | 2.032 | 2.024 | −.006 |
| B | Powdered graphite | N | 1:1 | 2.015 | 1.995 | −.020 |
| B | do | N | 1:2 | 2.018 | 2.034 | +.016 |
| B | do | N | 1:3 | 2.019 | 2.052 | +.033 |
| B | Powdered Zircon | N | 1:2 | 2.009 | 1.980 | −.029 |
| B | do | N | 1:4 | 2.008 | 1.997 | −.011 |
| B | do | N | 1:6 | 2.006 | 2.005 | −.001 |

A. Tetrafluoroethylene homopolymer of colloidal size, without dispersing agent, suspended in water.
B. Same as A, but dispersed in ammoniacal aqueous solution containing dispering agent (Triton N-100).
M. Dry filler mixed with aqueous suspension of polymer+mixture dried at 100° C.
N. Same as M, with acetone employed as coagulant.

Since dimension change is inversely related to density change, it is apparent from the foregoing table that the density change on sintering (densities being compared at 25° C.) can be limited to a few hundredths of a unit or less by employing the preferred critical weight ratio of polymer:filler. This critical ratio differs with the nature of the filler, each filler having its own characteristic critical ratio for no dimensional change. When the amount of filler exceeds the critical amount, a volume increase on sintering is generally observed; when the amount of filler is less than the critical value, a volume decrease occurs on sintering. In the table given above a dimension change of 0.007 in. is equal to a density change of 0.01 unit.

*Example 11.*—A 20% (by weight) colloidal dispersion of chlorotrifluoroethylene polymer in water was mixed with coke flour (weight proportions, 1 polymer:2 coke flour) and thinned with toluene sufficiently to produce a slurry which could be filtered. The powdery mixture obtained by filtration was dried, which yielded a free-flowing powder. The dry powder was shaped in a mold at ordinary temperature (25° C.) under a pressure of 10,000 pounds per square inch. The preforms thus obtained were removed from the mold and were sintered by heating in an oven for 30 minutes at 345° C. The sintered articles had the following properties.

The chlorotrifluoroethylene polymers referred to hereinabove have properties similar to those of polytetrafluoroethylene. Molded, sintered, objects made from colloidal-sized polymerized chlorotrifluoroethylene dry particles and finely divided carbon are similar to those made from polytetrafluoroethylene and finely divided carbon. For example, when the weight ratio of filler to polymer is from 2:1 to 3:1 the shaped articles obtained from either polytetrafluoroethylene or polychlorotrifluoroethylene, by compression in a mold (e. g. at room temperature) under pressure in excess of 1000 pounds per square inch, followed by sintering at 300° to 410° C., have compressive strengths above 5000 pounds per square inch and generally within the range of 5000 to 10,000 pounds per square inch. Like polytetrafluoroethylene, polychlorotrifluoroethylene has a minimum sintering temperature of 300° to 327° C. The fillers which are effective are the same as in the case of polytetrafluoroethylene, viz. zircon, graphite, coke flour, etc.

It will be understood that the above examples are illustrative only and that numerous embodiments of the invention will occur to those who are skilled in the art. For example, various forms of finely divided carbon may be employed. The particle size of the carbon can be varied. For example, commercially available graphite powder in such a state of subdivision that 99% passes through a 200 mesh screen gives excellent results, but graphite in the form of somewhat larger particles also is highly satisfactory. Similarly a commercially available coke flour in such a state of subdivision that 56% passes through a 200 mesh screen, the remainder particles passing through a 35 mesh screen, gives outstanding results, but coke flour of larger particle size is also effective.

As illustrated hereinabove, high quality materials of construction can be obtained from mixtures containing as high as 90%, or more, of carbon, in accordance with this invention.

This invention is useful in the manufacture of chemically inert materials of construction, such as pipes, tubes, pipe liners, bushings, seals, reaction vessels, valves, crucibles, and the like, as well as various specialties such as electrical insulators, decorative articles, etc. It is also useful in the manufacture of shaped articles by methods other than by pressure molding, e. g. extrusion, casting, puddling, injection molding, and calendering.

I claim:

1. A pressure-coalescing molding composition comprising colloidal particles of a polymer of the class consisting of tetrafluoroethylene polymers and chlorotrifluoroethylene polymers, intimately admixed with coke flour filler, the quantity of filler being from 1 to 9 parts by weight per part of said polymer, the minimum sintering temperature of the polymer being within the range of 300° to 327° C.

2. A pressure-coalescing molding composition characterized in that molded articles obtained therefrom under a pressure in excess of 1000 pounds per square inch do not change dimensionally upon being heated to a sintering temperature within the range of 300° to 410° C., said composition comprising a tetrafluoroethylene polymer in the form of particles of colloidal size intimately admixed with coke flour, the weight ratio of coke flour to the said polymer being 1:1 to 3:1, the minimum sintering temperature of the polymer being within the range of 300° to 327° C.

3. The composition of claim 2 in which the said polymer is a tetrafluoroethylene homopolymer.

4. The composition of claim 2 in which the said polymer is a methanol-tetrafluoroethylene telomer.

5. A pressure-coalescing molding composition comprising a tetrafluoroethylene polymer and coke flour, said composition being characterized in that molded articles obtained therefrom by shaping under a pressure in excess of 1000 pounds per square inch do not undergo a density change, measured at 25° C., of greater than 0.01 when heated to a sintering temperature within the range of 300° to 410° C., said composition comprising a tetrafluoroethylene polymer particles of colloidal size intimately admixed with coke flour, the weight ratio of coke flour to the said polymer being within the range of 2:1 to 3:1, the minimum sintering temperature of the polymer being within the range of 300° to 327° C.

6. The composition of claim 5 in which the said polymer is a tetrafluoroethylene homopolymer.

7. The composition of claim 5 in which the said polymer is a methanol-tetrafluoroethylene telomer.

8. A pressure-coalescing molding composition comprising a polymer of the class consisting of tetrafluoroethylene polymers and chlorotrifluoroethylene polymers admixed with coke flour, said composition being characterized in that molded articles can be formed therefrom by shaping under a pressure in excess of 1000 lbs. per square inch followed by heating at a sintering temperature within the range of 300° to 410° C., have compressive strengths above 5000 pounds per square inch, said composition comprising the said polymer particles of colloidal size admixed with coke flour, the weight ratio of coke flour to the said polymer being within the range of 2:1 to 3:1, the minimum sintering temperature of the polymer being within the range of 300 to 327° C.

References Cited in the file of this patent

UNITED STATES PATENTS

| | | |
|---|---|---|
| 2,396,629 | Alfthan et al. | Mar. 19, 1946 |
| 2,400,099 | Brubaker et al. | May 14, 1946 |
| 2,578,523 | Llewellyn | Dec. 11, 1951 |
| 2,592,147 | Ikeda | Apr. 8, 1952 |
| 2,685,707 | Llewellyn et al. | Aug. 10, 1954 |